United States Patent [19]
Ishizaki et al.

[11] 3,758,843
[45] Sept. 11, 1973

[54] BRUSHLESS EXCITATION DEVICE

[75] Inventors: Akira Ishizaki; Tatuya Hirasawa; Michiteru Nakamura; Takeshi Kawade, all of Tokyo, Japan

[73] Assignee: Kabushiki Kaisha Meidensha, Tokyo, Japan

[22] Filed: June 27, 1972

[21] Appl. No.: 266,740

[30] Foreign Application Priority Data
Aug. 14, 1971 Japan.................................. 46/72430

[52] U.S. Cl...................... 322/25, 322/27, 322/28, 322/73, 322/75, 322/87
[51] Int. Cl. .......................................... H02p 9/30
[58] Field of Search ................... 322/25, 27, 28, 73, 322/75, 86, 87

[56] References Cited
UNITED STATES PATENTS
3,401,328  9/1968  Hartung.................................. 322/28
3,411,068  11/1968  Krebs..................................... 322/25
3,492,555  1/1970  Shibata.............................. 318/176

Primary Examiner—James D. Trammell
Attorney—Eric H. Waters et al.

[57] ABSTRACT

A brushless excitation device in which the output voltage and load current of an A.C. generator are detected and the detected voltage and current are applied to an automatic voltage regulator inserted and connected into a rotary portion of the generator by means of a rotary transformer, the field current of the generator being controlled by the output of the automatic voltage regulator.

6 Claims, 9 Drawing Figures

BRUSHLESS EXCITATION DEVICE

FIELD OF THE INVENTION

The present invention relates to an excitation device for an A.C. generator, and more particularly to a brushless excitation device in which current from an A.C. machine is supplied as a field current to a field winding of the A.C. generator through a rectifier device including a control rectifier.

BACKGROUND

A brushless excitation system for an A.C. generator is a most advantageous excitation technique from the standpoint of maintenance. Recently, there has been an increasing tendency to employ such systems in A.C. generators used in oil or a gas atmosphere which might give rise to abnormal wear and tear on brushes, and in high speed generators, generators having long periods of rest, and generators having a large number of brushes.

However, there are problems with brushless excitation devices which unfortunately are characterized by slow responses to fluctuations of load. Also, when short-circuiting occurs, a quick response is impossible.

In order to obtain conventional quick response excitation such as, for example, in Japanese Utility Model Registration No. 756,507 (registered on Jan. 8, 1965), there has been proposed an excitation device in which a control rectifier (hereinafter called a "thyristor") is connected between the field winding of an A.C. excitation machine and the field winding of a generator, and an output voltage and a reference voltage of the generator are compared, and a resultant deviation signal which is transmitted from the stationary side to the rotary side provides a gate signal for the thyristor. In this kind of excitation device, an amplifying means is necessary because of the very small size of the deviation signal and, as a result, the device becomes expensive. Another important drawback is that adverse influences due to noise are great. In order to prevent the effect of noise, it has been proposed to amplify the minute deviation signal at the stationary side, but an object of the control is to make the deviation signal zero. Thus, even if amplification is effected to a substantial degree, the deviation signal still becomes minute, when the output voltage of the generator reaches a predetermined voltage. Therefore, no matter how amplification may be effected, there are still drawbacks due to noise which cannot be avoided. Furthermore, in order to transmit this control signal from the stationary side to the rotary side of the apparatus, a complicated and expensive device is required.

SUMMARY OF THE INVENTION

According to the present invention, for controlling a field current of the generator, a rotary transformer such as disclosed in Japanese Utility Model Registration No. 908,719 registered on Aug. 18, 1970 is employed without making use of a minute deviation signal of the output voltage of the generator which is transmitted to the rotary portion. A proper voltage signal which may be treated in similar manner to a power transmission is transmitted from the stationary side to the rotary side, and the detection of deviation obtained by comparison of the transmitted voltage and a reference voltage is effected by the rotary portion of the apparatus. The gate of the thyristor of a rectifier device inserted in the field winding of the generator is arranged to be controlled by the detected deviation signal. In such a manner, the various problems mentioned above are avoided.

A primary object of the present invention is to provide an excitation device which is inexpensive and of high performance.

A second object of the present invention is to provide a generator having a response speed relating, for example, to excitation at the time of fluctuation of load which is fast and in which a quick response in excitation at the time of short-circuiting is possible.

A third object of the present invention is to provide an excitation device in which the capacity of the field rectifier can be small and wherein the rectifier can be of small size and manufactured at relatively low cost.

BRIEF DESCRIPTION OF THE DRAWING

The invention will next be described in detail with reference to the accompanying drawing, in which.

DETAILED DESCRITPION

Prior to an explanation of the embodiments of the present invention and in order that the present invention be fully understood with respect to its objects, construction, and function as well as its technical effects, one example of a conventional brushless excitation device will next be described with reference to FIG. 1.

Figure 1:
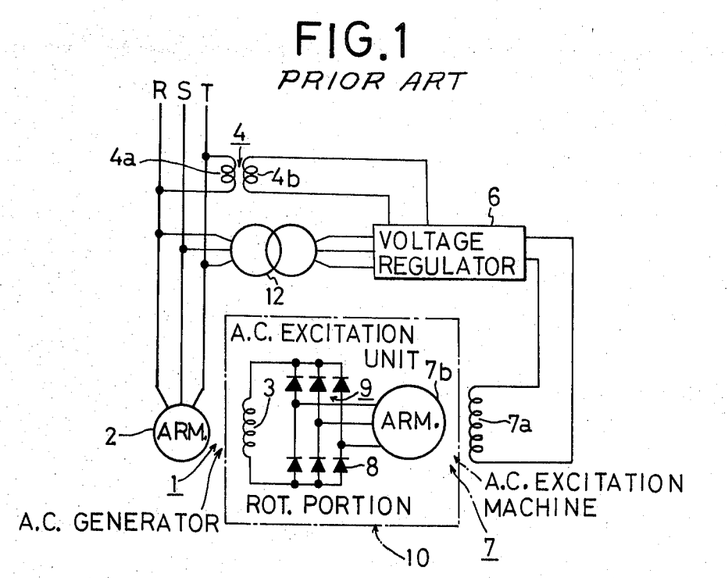
FIG. 1 is a schematic diagram of a brushless excitation device for a conventional A.C. generator.

In FIG. 1, element 1 is an A.C. generator, elements 2 and 3 are respectively an armature and a field winding for generator 1, element 4 is a voltage transformer, for detecting the terminal voltage of the armature 2, having a primary winding 4a connected to an arbitrarily selected one of the output buses of the armature 2, for example the R and T phases, element 12 is a transformer, for supplying a field current, having a primary winding thereof connected to the S phase of the output bus, and element 6 is an automatic voltage regulator. Element 7 is an A.C. excitation machine or unit. Its energizing winding 7a is connected to the output side of the automatic voltage regulator 6, and its armature 7b is connected to the field winding 3 of the A.C. generator by means of a rectifier 9 consisting of rectifier elements such as, for example, diodes 8. The armature 7b, rectifier 9 and field winding 3 form a rotary portion 10 enclosed by a dotted line.

In the conventional brushless excitation device, a diode 8 is used as a rectifier for supplying a D.C. current to the field winding. Therefore, an adjustment of the field current of the generator 1 must be carried out by current adjustment for the energizing winding 7a of the A.C. excitation machine 7. Accordingly, the speed of response of the excitation circuit is decreased by the time delay of the A.C. excitation machine which effectively has a delay element at the time of fluctuation of load of the genarator 1. Also, the output terminal voltage of the generator 1 is detected by means of the transformer 4 and automatic voltage regulator 6, and an excitation signal for the A.C. excitation machine 7 is suppled from transformer 12 having a primary winding connected to the output bus of the A.C. generator through the automatic voltage regulator 6 connected thereto. Therefore, when short-circuiting occurs, the terminal voltage of the generator 1 becomes zero and quick response excitation becomes impossible.

Figure 2:
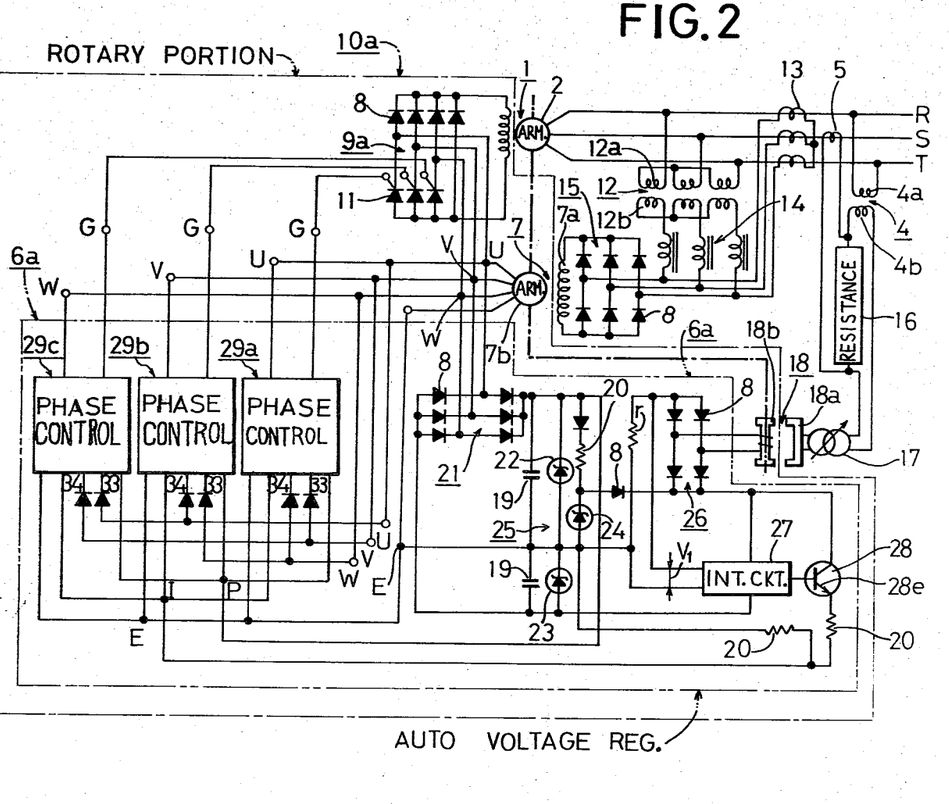
FIG. 2 is a schematic diagram of a brushless excitation device according to a first embodiment of the present invention.

The present invention has solved these problems as will be described below with respect to various embodiments shown by the accompanying drawings as follows:

In FIG. 2, which shows a first embodiment of the present invention, elements previously identified in FIG. 1 are shown by the same reference numeral. In this first embodiment, the field current from an A.C. excitation machine is supplied as a field current to the field winding of an A.C. generator through a rectifier device including a control rectifier. A primary winding 12a of a transformer 12 for supplying the current proportional to the terminal voltage and a primary winding of a current transformer 13 for supplying the current proportional to the output current of the generator 1 are connected to the R, S and T phases of the output bus of the armature 2 of the A.C. generator 1. Reactors 14 are connected between secondary windings of the current transformer 13 and secondary windings 12b of the transformer 12. The junction of the reactors 14 and the secondary windings of the current transformer 13 is connected to the A.C. input side of a rectifier 15 consisting of diodes 8. The D.C. output side of the rectifier 15 is connected to the energizing winding 7a of the A.C. excitation machine 7. A compound characteristic synthesizing means for imparting a compound characteristic to the generator 1 is formed by the transformer 12, the current transformer 13 and the reactors 14.

The output from the armature 7b of the A.C. excitation machine 7 is supplied to a field winding 3 of the A.C. generator 1 by means of the rectifier device 9a consisting of a control rectifier such as, for example, thyristors 11 (or thyristors are included partially). On the other hand, the output of a secondary side of a voltage transformer 4 for detecting the output terminal voltage of the A.C. generator 1 and the secondary output of the current transformer 5 for detecting the load current of the generator 1 are synthesized by means of a resistor 16. This synthesized voltage is applied to the winding 18a at the stationary side of a rotary transformer 18 by the voltage setting device 17, and the voltage is magnetically transmitted to the rotary side winding 18b from the stationary side winding 18a, and this voltage is applied to the automatic voltage regulator 6a.

This automatic voltage regulator 6a consists of a rectifier device 21 whose A.C. input side is connected to the armature 7b of the A.C. excitation machine 7, a reference voltage setting circuit 25 comprising Zener diodes 22-24 for setting the D.C. output voltage of the rectifier device 21 to the reference voltage, a rectifier device 26 whose A.C. input side is connected to the rotary side winding 18b of the rotary transformer 18, and a deviation voltage setting resistor r which is connected between the D.C. output negative terminal of the rectifier device 26 and the ground terminal of the reference voltage setting circuit 25 to form a voltage comparing circuit for obtaining a deviation voltage $V_1$ by comparing the reference voltage and the output voltage of the generator 1. Regulator 6a further includes an integration circuit 27 and a transistor 28 for amplifying the deviation voltage $V_1$ obtained by the voltage comparing circuit, and phase circuit 29a-29c for converting the deviation voltage which is amplified by the amplifier circuit into the gate signal for the thyristor 11.

Figure 3:
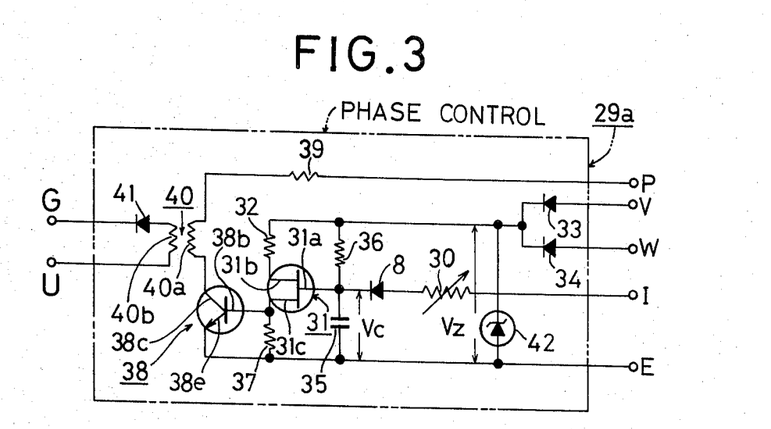
FIG. 3 is a schematic diagram of a phase control circuit used in the brushless excitation device in accordance with the present invention.

In these phase control circuit 29a-29c, as shown in FIG. 3, one end of a variable resistor 30 is connected to an emitter 28e of the transistor 28 and the other end of the variable resistor 30 is connected through a diode 8 to an emitter of a unijunction transistor 31, the base 31b of which is connected through a resistor 32 and diodes 33 and 34 to the specified two phases of the U, V and W phases of the armature winding of the A.C. excitation machine 7 and its base 31c is connected to a terminal E for the reference voltage setting circuit 25 through a discharging resistor 37 and is also connected to a base of a transistor 38, the emitter of which is connected to the reference voltage setting circuit 25. Its collector is connected to a primary winding 40a of a pulse transformer which is also connected to a terminal P for a D.C. voltage source through a resistor 39 and its secondary winding 40b is connected to a terminal G for the gate of the thyristor 11 and a terminal U (W,V) for the armature 2 of the A.C. excitation machine 7 through diodes 41 and 42, respectively. First ends of a resistor 36 and a capacitor 35 are commonly connected to the base of the unijunction transistor 31 and the other ends thereof are connected to a junction of diodes 33 and 34, and the terminal E, respectively.

The field winding 3 of the A.C. generator 1, the automatic voltage regulator 6a, armature 7b, and rotary rectifier device 10a are disposed on a common rotary axis so as to form the rotary portion 10a, and the detected voltage proportional to the terminal voltage of the generator 1 is transmitted to the rotary portion 10a by means of the rotary transformer 18. Therefore, in the present invention, the transmission of the voltage from the stationary side to the rotary side is effected without a mechanical contact portion such as a brush, slip ring or the like.

The current transformer 5 and resistor 16 become unnecessary for a single generator operation as they are used for the compensation of cross current which is generated when generators are operated in parallel. Also, the transformer 4 may be omitted in case the output voltage of the generator 1 is relatively low. The voltage setting device 17 is used for changing the set value of the output voltage of the generator 1, and therefore it may be omitted in case only a fixed output voltage is required.

The circuit described above functions as follows:

When the generator 1 is driven and rotated with a prime mover (not shown in the drawing), a small output voltage is generated by the residual magnetism of the generator 1. This voltage excites the field winding 7a by means of the transformer 12, the reactors 14 and the field rectifier 15 and generates the voltage in the armature 7b. If the voltage to be generated in the output terminal by the residual magnetism of the generator 1 excites the excitation machine 7, but does not reach a value sufficient to generate the output voltage of the excitation machine 7, a voltage generating cirucit (not shown in the drawing) may be added to the field winding 7a of the excitation machine. With this arrangement, the A.C. voltage generated in the armature 7b of the A.C. excitation machine 7 is applied to the rotary rectifier device 9a and is also applied to the reference voltage setting circuit 25 as a D.C. voltage through the rectifier device 21. The reference voltage is set by the Zener diodes 22–24.

On the other hand, a voltage proportional to the output terminal voltage of the generator 1 is detected at the voltage transformer 4 and is applied to the stationary side winding 18a of the rotary transformer 18. Because of this, the detected voltage proportional to the output voltage of the generator 1 is transmitted to the rotary side winding 18b. This detected voltage is applied to the reference voltage setting circuit 25 as a D.C. voltage through the rectifier device 26, and is compared with the reference voltage to obtain a deviation voltage $V_1$, with the resistor $r$.

After this deviation voltage $V_1$ is amplified by an amplifier circuit consisting of an integration circuit 27 and a transistor 28, it is introduced to phase control circuits 29a–29c. For example, it can be introduced into the phase control circuit 29a as its input, as shown by the curves V and W in FIG. 4a. The output from the armature 7b of the A.C. excitation machine 7 is introduced through the rectifier diodes 33 and 34. This input is preset to the specified voltage of the constant voltage diode 42 (FIG. 3). When the charging voltage Vc of the capacitor 35 becomes equal to this specified voltage Vz, the unijunction transistor 31 is operated and the output signal is generated therefrom.

Figure 4A:
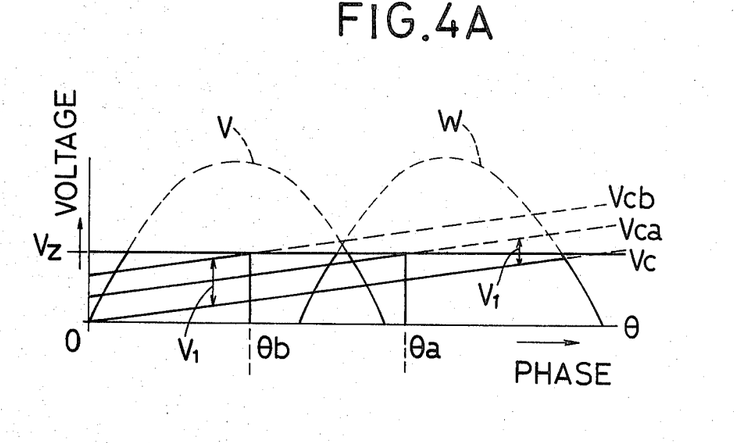
FIGS. 4a and 4b are a waveform diagram for the excitation device of the present invention.
Figure 4B:
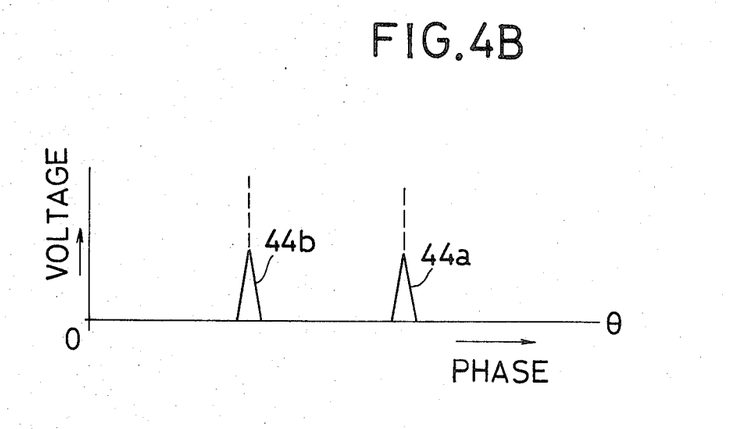

However, when the deviation voltage $V_1$ is applied through the resistor 30 and the diode 8, as shown in the charging voltage curves Vca and Vcb in FIG. 4a, the terminal voltage of the capacitor 35 is increased by an amount corresponding to the deviation voltage $V_1$. The unijunction transistor 31 generates the output signals 44a and 44b at the phase angles of $\theta a$ and $\theta b$ according to the magnitude of the deviation voltage $V_1$, as shown in FIG. 4b, this output signal being controlled by the deviation voltage $V_1$. Accordingly, the phase of the pulse current flowing through the transistor 38, the pulse transformer 40 and the diode 41 for rectifying pulse current is controlled by the magnitude of the deviation voltage $V_1$. Therefore, the firing angle of the thyristor 11 is controlled in proportion to the output terminal voltage of the generator 1, and the current of the field winding 3 changes and the output voltage of the A.C. generator 1 is maintained at a constant value.

Also, when the generator 1 is operated in parallel to other generators (not shown in the drawing), because of the necessity for the compensation of cross current, the currents proportional to the load current of the generator 1 are synthesized at the secondary side of the transformer 4 through the resistor 16 with current transformer 5, and such synthesized current is applied to the rotary transformer by means of the voltage setting device 17. When the residaul voltage of the generator 1 or the terminal voltage of the A.C. excitation machine 7 generated by the voltage building-up circuit (not shown in the drawing) reaches a certain value, the automatic voltage regulator 6a starts to operate and the gate of thyristor 11 is fired to supply current to the field winding 3 and to increase the terminal voltage of the generator 1 and a preset voltage is generated therefrom.

In case the generator 1 is at no load, the current is supplied to the field winding 7a and the A.C. excitation machine 7 by means of the transformer 12, the reactor 14 and the field rectifier 15. In case the generator 1 is operated with load, a current proportional to the load current is detected by the current transformer 13 for a compound arrangement which is entirely identical with the normal compound type self-excited A.C. generator. This current and the current flowing in the reactors 14 for excitation are summed in vector mode, and this synthesized current is supplied to the energizing winding 7a. Accordingly, regardless of larger or smaller values of the load and changes of the load power factor, the terminal voltage of the A.C. excitation machine 7 is maintained nearly constant. Also, the terminal voltage of generator voltage of the generator 1 is maintained constant by the operation of the automatic voltage regulator 6a and the thyristors 11.

When the load of the generator 1 is rapidly changed, the change in terminal voltage of the generator 1 is transmitted to the automatic voltage regulator 6a of the rotary portion immediately by means of the rotary transformer 18. By operation of this automatic voltage regulator 6a, the gate of the thyristor 11 is controlled and the terminal voltage of the generator 1 is swiftly maintained at the set value. Furthermore, the voltage to be transmitted from the stationary side to the rotary side is not a small control signal such as the deviation component between the output voltage and reference voltage of the generator 1 but instead a large detected voltage is transmitted to the rotary side as it is. Therefore, the adverse influence caused by noise does not result and the voltage faithfully follows the fluctuating component of the output voltage.

In case the terminal voltage of the excitation machine 7 for determining the voltage of the excitation system is maintained sufficiently large so that the field current is contained in the adjusting range of the thyristors 11, the thyristors 11 can sufficiently control the field current, and the A.C. excitation machine 7 does not influence the time delay of the control system and its responding property is remarkably improved.

As will be cearly understood from the foregoing detailed description of the present invention, the following technical effects can be obtained by the present invention:

The first technical effect is that sufficiently good characteristics of the generator can be obtained as the field current is adjusted directly by using the thyristor in the field circuit.

The second technical effect is that the excitation of the A.C. excitation machine is obtained from the terminal voltage of the generator and the field energy for the excitation machine is obtained through the compound current transformers and is supplied to the excitation machine to effect the compound characteristics, and therefore its reliability is improved as there is no loss of excitation function even at an abnormal operating condition such as short-circuiting of the generator, and it returns to the normal condition swiftly at recovery from the trouble.

The third technical effect is that since the excitation capacity of the A.C. excitation machine can be made sufficiently small, the composition elements for rendering the compound characteristics, namely the capacities of combined voltage and current transformers, the current transformer, the reactors and the field rectifier can be made small thus they can be manufactured economically as compared to other types.

The fourth technical effect is that the rotary transformer is designed to transmit the detected voltage from the stationary side to the rotary side, and therefore its capacity can be made extremely small (e.g., several VA) and, for example, if a solid iron steel core is used as the core material, the excitation device has a simple structure and high mechanical strength and can be manufactured at low cost.

Figure 5:
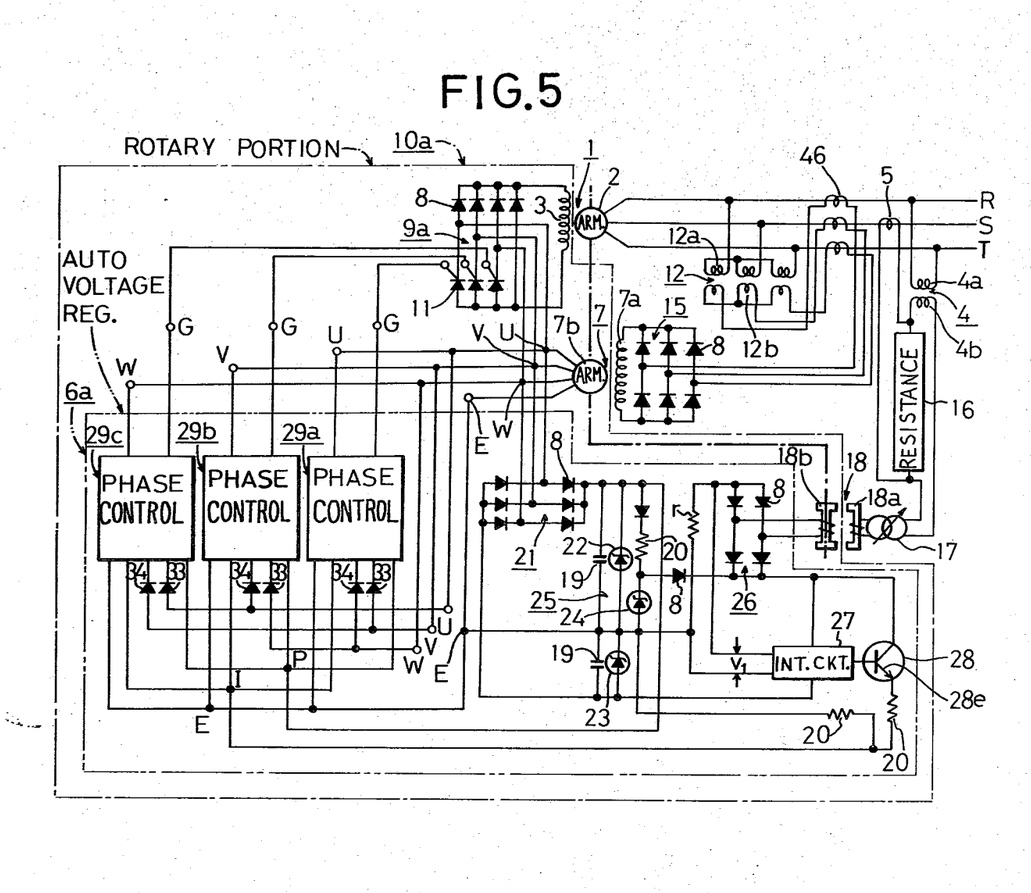
FIG. 5 is a schematic diagram of a second embodiment of the present invention.

The second and third embodiments of the present invention will next be described. The second embodiment shown in FIG. 5 is similar in construction to that shown in FIG. 2 with the exception that in FIG. 2 the secondary windings of the transformer 12 are connected to the rectifier 15 through the reactors 14, but in FIG. 5 the secondary windings of the transformer 12 are directly connected to the rectifier 15. That is to say, in the first embodiment shown in FIG. 2, current flowing through the transformer 12 and the reactors 14 and current of the current transformer 13 are synthesized in a vector mode to provide the compound characteristic of the current superposition. To the contrary, the second embodiment of this invention is constructed in such a way that the compound characteristic of the voltage-current superposition is obtained by synthesizing the secondary winding voltage of the transformer 12 and the secondary winding current of the current transformer 46 because of the omission of the reactors 14. Although there is a certain difference in the characteristics when compared with the first embodiment, there are essentially produced a function and effect similar to those of the first embodiment.

Figure 6:
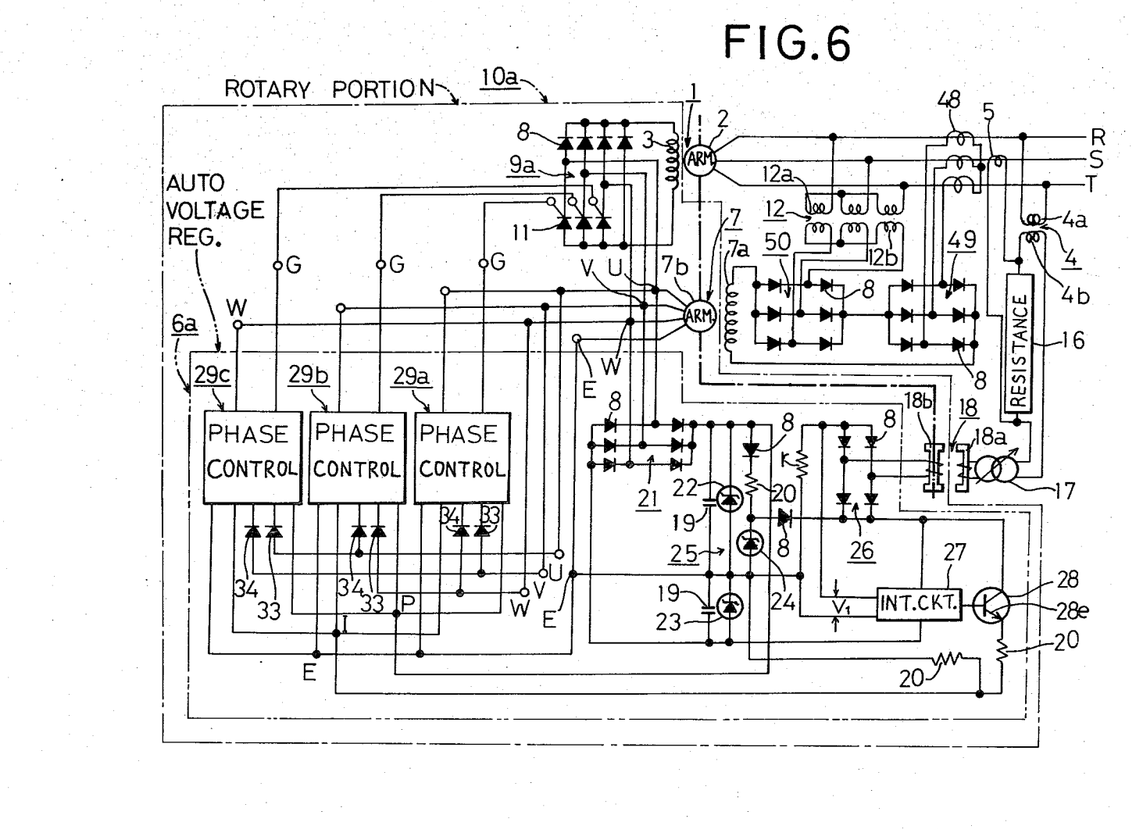
FIG. 6 is a schematic diagram of a third embodiment of the present invention.

FIG. 6 shows a third embodiment of the present invention. In this third embodiment, the output current of the transformer 12 and the output current of the compound current transformer 48 are rectified with rectifiers 49 and 50 respectively. Thereafter, these direct currents are summed in scalar mode to build up the desired compound characteristic and said currents are applied to the energizing winding 7a. Therefore, the third embodiment is somewhat similar to each of the first two embodiments.

The fourth and fifth embodiments of the present invention will next be described with reference to FIG. 7 and FIG. 8.

Figure 7:
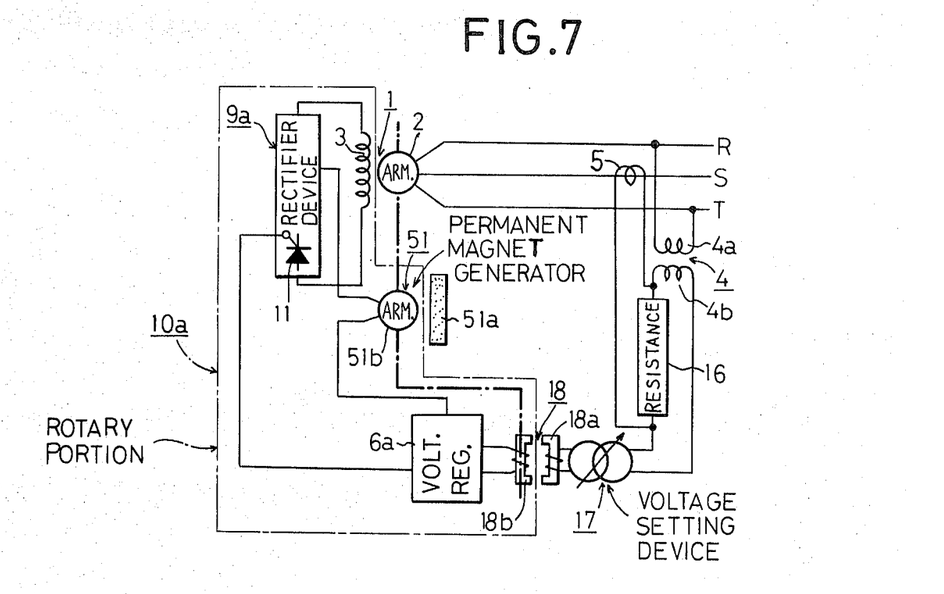
FIG. 7 is a schematic diagram of a fourth embodiment.

FIG. 7 shows the fourth embodiment of the present invention in which a permanent magnet generator 51 is used instead of the A.C. excitation machine 7 in the first through third embodiments. The voltage is generated in the armature 51b with the permanent magnet 51a provided at the stationary side, and this generated voltage is supplied to the field winding 3 of the A.C. generator 1 through the rotary rectifier device 9a consisting of a control rectifier such as the thyristor 11. The output voltage of the permanent magnet generator 51 and the detected voltage obtained by means of the rotary transformer 18 are applied to the automatic voltage regulator 6a.

In the fourth embodiment, when the generator 1 is rotated with the prime mover (not shown), as the permanent magnet generator 51 is used instead of the A.C. excitation machine 7, the voltage is generated in the armature 51b. When this voltage reaches a certain value, the automatic voltage regulator 6a starts the operation to generate the output and the gate of the thyristor employed in the rectifier device 9a is fired. Accordingly, the current flows to the field winding 3 and the output voltage of the generator 1 is elevated and the constant voltage presented by the voltage setting device 17 is maintained.

However, the terminal voltage of the permanent magnet generator 51 is not constant and is caused to fluctuate by a variation in load on the generator 1. When the output terminal voltage of the permanent magnet generator 51 is set to a high value so that the current to be supplied to the field winding 3 from the generator 51 is included in the adjusting range of the thyristor 11, the thyristor 11 can sufficiently control the field current and the terminal voltage of the generator 1 can be maintained at a constant value.

It will be obvious that even if the generator 51 is used instead of the A.C. excitation machine 7, a function similar to that of each of the foregoing embodiments can be effected. It will also be understood that an effect similar to that of each of the embodiments mentioned in the foregoing can be obtained. In the fourth embodiment, there are advantages in that even in the case of short-circuiting of the generator 1, the permanent magnet generator 51 serving as the excitation machine has an excitation function. Thus, reliability at the time of trouble is improved and, when the trouble is overcome, it returns to the original condition immediately.

Figure 8:
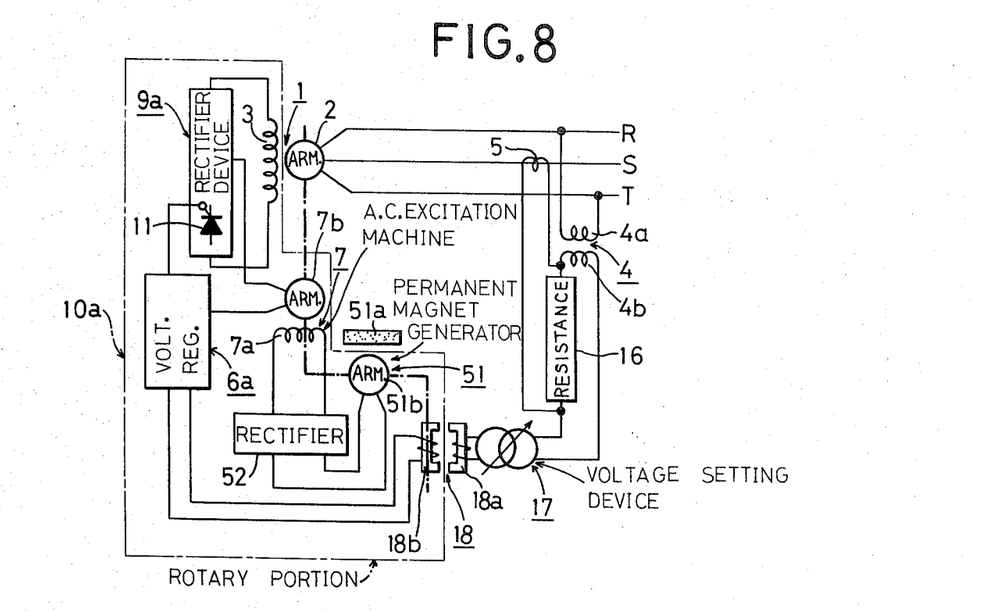
FIG. 8 is a schematic diagram of a fifth embodiment.

In the fifth embodiment shown in FIG. 8, the provision of the permanent magnet generator 51 in the rotary portion 10a of the generator 1 is similar to the fourth embodiment, but the A.C. excitation machine 7 is inserted in the rotary portion 10a, and a D.C. current is supplied to the energizing winding 7a of this A.C. excitation machine 7 by means of a recitifer device 52 from the armature 51b of the generator 51. The function and technical effect are similar to those on the fourth embodiment. In this fifth embodiment, as the permanent magnet generator 51 is used for the excitation of the A.C. excitation machine 7, there is an advantage that this permanent magnet generator 51 is required to have only a capacity sufficient to excite the excitation machine and even in case the generator 1 is of large capacity, permanent magnet generator 51 needs only a relatively small capacity. Thus, the excitation device can be small and of low cost.

In the fourth and fifth embodiments, even if a coil connected to the D.C. power source is used instead of the permanent magnet 51a of the generator 51, a similar function can be effected.

Preferred features and characteristics of the present invention can be summed up as follows:

1. A brushless excitation device can be provided in which the output voltage of an A.C. generator is detected, and this detected voltage is transmitted to the rotary side from the stationary side through a rotary transformer to be applied to an automatic voltage regulator which is connected to the rotary portion and a control rectifier which is inserted and connected to the field winding of the A.C. generator is controlled by the output signal of the automatic voltage regulator.

2. A brushless excitation device can be provided in which a compound characteristic synthesizing means for effecting super-position of the current and voltage is connected to the output bus of the A.C. generator, and the exciting energy is supplied to the field winding of the A.C. excitation machine from the output bus through the compound characteristic synthesizing means.

3. An excitation device can be provided having current-superposed compound-characteristics according to item (2) above in which the primary winding of the excitation transformer for supplying the current proportional to the terminal voltage and the primary winding of the current transformer for supplying the current proportional to the output current of the output bus are connected to the output bus of the A.C. generator, and a reactor is connected between the secondary winding of the excitation transformer and the secondary windings of the current transformer, and the current flowing through the excitation transformer and reactors and the current of the current transformers are synthesized in vector mode.

4. An excitation device can be provided having voltage-superposed compound characteristics according to item (3) above in which the primary winding of the exciting transformer and the primary winding of the combined voltage and current transformer are connected to the output bus and the secondary voltage of the exciting transformer and the secondary voltage of the combined voltage and current transformer are synthesized in vector mode.

5. An excitation device can be provided having scalar-sum compound-characteristics according to item (4) above in which the output current of the transformer and the output current of the combined voltage and current transformer are rectified and are then synthesized in scalar mode.

6. A brushless excitation device can be provided according to item (2) above in which a permanent magnet generator is used instead of the compound-characteristic synthesizing means and the A.C. excitation machine as the field power source for the A.C. generator.

7. A brushless excitation device can be provided according to item (6) above in which the output power of the permanent magnet generator which is used as the field power source is supplied to the field winding of the A.C. generator through the rectifier device.

8. An excitation device according to the above items (1) through (7) in which an automatic voltage regulator comprises a reference voltage setting circuit for rectifying the output current of the excitation machine and setting the reference voltage, a comparing circuit for comparing the D.C. output voltage of the rectifier device, whose A.C. input side is connected to a winding on the rotary side, with the reference voltage to obtain the deviation voltage, an amplifier circuit for amplifying this deviation voltage, and a phase control circuit for converting the deviation voltage amplified by the amplifier cirucit into a control signal for the control rectifier.

9. An excitation device according to item (8) above in which a comparing circuit comprises a resistor for setting a deviation voltage which is inserted between a negative terminal at the D.C. output of a rectifier device for rectifying the A.C. input from the terminal output voltage of the generator and the ground terminal side of the reference voltage setting circuit.

10. An excitation device according to item (8) above characterized in that a phase control circuit comprises a unijunction transistor, capacitors inserted between the emitter terminal and base terminal of the unifunction transistor, and an oscillation circuit consisting of a charging resistor for the capacitor and a discharge resistor therefor and, as the D.C. power source for an oscillation circuit, the voltage is obtained from two specified phases of the armature winding of the A.C. excitation machine through a diode.

The present invention is not limited to the foregoing embodiments and includes excitation devices which may be derived therefrom or which may be obtained by making various modifications in the technical scope of the present invention.

What is claimed is:

1. A brushless excitation device for supplying a field current to field windings of an A.C. generator which generates an output voltage, said excitation device comprising an A.C. excitation means for producing an output current, rectifier means including control rectifiers connected to said field windings of said A.C. generator, a rotary transformer having rotary and stationary sides and receiving the output voltage of said A.C. generator at the stationary side, automatic voltage regulation means mounted on the rotary side for receiving the output voltage received at the stationary side of said rotary transformer through the rotary side thereof, said control rectifiers being controlled by the output of said automatic voltage regulation means.

2. A brushless excitation device as claimed in claim 1 comprising a compound characteristic synthesizing means for effecting superposition of current or voltage and connected to the output of the A.C. generator, and means for applying exciting energy to the A.C. excitation machine through the compound characteristic synthesizinG means.

3. A brushless excitation device as claimed in claim 1 comprising a permanent magnet generator supplying field power to the A.C. generator.

4. A brushless excitation device as claimed in claim 1 in which said rotary transformer is adapted to transmit the voltage proportional to the terminal voltage of said A.C. generator to the rotary side and the automatic voltage regulation means mounted on the rotary side comprises a reference voltage setting circuit for setting a reference voltage by rectifying the output current of said excitation means, a comparing circuit for comparing the D.C. output voltage of said rectifier means which has an A.C. input side connected to the rotary side of the rotary transformer to obtain a deviation voltage, an amplifier circuit for amplifying the deviation voltage obtained from the comparing circuit, and a phase control circuit for converting the amplified deviation voltage to a control signal for the control rectifier.

5. A brushless excitation device as claimed in claim 2 in which said rotary transformer is adapted to transmit the voltage proportional to the terminal voltage of said A.C. generator to the rotary side and the automatic voltage regulation means mounted on the rotary side comprises a reference voltage setting circuit for setting a reference voltage by rectifying the output current of said excitation means, a comparing circuit for comparing the D.C. output voltage of said rectifier means which has an A.C. input side connected to the rotary side of the rotary transformer to obtain a deviation voltage, an amplifier circuit for amplifying the deviation voltage obtained from the comparing circuit, and a phase control circuit for converting the amplified deviation voltage to a control signal for the control rectifier.

6. A brushless excitation device as claimed in claim 3 in which said rotary transformer is adapted to transmit to the voltage proportional to the terminal voltage of said A.C. generator to the rotary side the automatic voltage regulator mounted on the rotary side comprises a reference voltage setting circuit for setting a reference voltage by rectifying the output current of said excitation means, a comparing circuit for comparing the D.C. output voltage of said rectifier means which has an A.C. input side connected to the rotary side of the rotary transformer to obtain a deviation voltage, an amplifier circuit for amplifying the deviation voltage obtained from the comparing circuit, and a phase control circuit for converting the amplified deviation voltage into a control signal for the control rectifier.

* * * * *